(12) United States Patent
Appia et al.

(10) Patent No.: US 10,890,648 B2
(45) Date of Patent: Jan. 12, 2021

(54) METHOD AND APPARATUS FOR GENERATING ALIGNMENT MATRIX FOR CAMERA-RADAR SYSTEM

(71) Applicant: Texas Instruments Incorporated, Dallas, TX (US)

(72) Inventors: Vikram VijayanBabu Appia, Dallas, TX (US); Dan Wang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 364 days.

(21) Appl. No.: 14/857,000

(22) Filed: Sep. 17, 2015

(65) Prior Publication Data

US 2016/0116573 A1 Apr. 28, 2016

Related U.S. Application Data

(60) Provisional application No. 62/068,229, filed on Oct. 24, 2014.

(51) Int. Cl.
*G01S 7/40* (2006.01)
*G01S 13/86* (2006.01)
(Continued)

(52) U.S. Cl.
CPC ............ *G01S 7/40* (2013.01); *G01S 7/4026* (2013.01); *G01S 13/867* (2013.01);
(Continued)

(58) Field of Classification Search
CPC ................. G01S 7/40; G01S 7/4026
(Continued)

(56) References Cited

U.S. PATENT DOCUMENTS 6,834,232 B1 * 12/2004 Malhotra ............... G08G 1/163
340/903
6,933,883 B2 * 8/2005 Isaji ...................... G01S 7/4052
342/174

(Continued)

OTHER PUBLICATIONS

Ji et al., "Radar-Vision Fusion for Object Classification", Information Fusion, 2008 11th International Conference, Jun. 30, 2008-Jul. 3, 2008, pp. 265-271.

(Continued)

*Primary Examiner* — Marcus E Windrich
(74) *Attorney, Agent, or Firm* — Brian D. Graham; Charles A. Brill; Frank D. Cimino

(57) ABSTRACT

A method of generating an alignment matrix for a camera-radar system includes: receiving radar data originated by a radar subsystem and representative of an area of interest within a field of view for the radar subsystem; receiving image data originated by a camera subsystem and representative of the area of interest within a field of view for the camera subsystem; processing the radar data to detect features within the area of interest and to determine a reflected radar point with three dimensions relating to a camera-radar system; processing the image data to detect features within the area of interest and to determine a centroid with two dimensions relating to the camera-radar system; and computing an alignment matrix for radar and image data from the camera-radar system based on a functional relationship between the three dimensions for the reflected radar point and the two dimensions for the centroid.

20 Claims, 11 Drawing Sheets

(51) Int. Cl.
*H01Q 15/18* (2006.01)
*G01S 13/931* (2020.01)

(52) U.S. Cl.
CPC ....... *G01S 13/931* (2013.01); *G01S 2007/403* (2013.01); *G01S 2007/4034* (2013.01); *G01S 2013/93271* (2020.01); *G01S 2013/93272* (2020.01); *G01S 2013/93274* (2020.01); *H01Q 15/18* (2013.01)

(58) Field of Classification Search
USPC .............................................. 342/52, 70–72
See application file for complete search history.

(56) References Cited

U.S. PATENT DOCUMENTS

| | | | | |
|---|---|---|---|---|
| 7,176,830 | B2* | 2/2007 | Horibe | G01S 17/86 342/70 |
| 7,501,980 | B2* | 3/2009 | Focke | G01S 13/867 342/174 |
| 7,706,978 | B2* | 4/2010 | Schiffmann | G01S 13/931 701/301 |
| 8,001,860 | B1* | 8/2011 | Preston | G01P 15/02 73/866.5 |
| 8,466,827 | B2* | 6/2013 | Nanami | G01S 13/426 342/70 |
| 8,604,968 | B2* | 12/2013 | Alland | B60R 1/00 342/70 |
| 8,872,919 | B2* | 10/2014 | Watanabe | B60R 1/00 348/148 |
| 9,405,006 | B2* | 8/2016 | Ouchi | G08G 1/166 |
| 2003/0011509 | A1* | 1/2003 | Honda | G01S 13/931 342/70 |
| 2003/0201929 | A1* | 10/2003 | Lutter | G01S 11/12 342/52 |
| 2014/0050352 | A1* | 2/2014 | Buehler | G01N 21/359 382/103 |
| 2015/0123838 | A1* | 5/2015 | Shi | H01Q 21/0075 342/70 |

OTHER PUBLICATIONS

Zhang et al., "Calibration between Depth and Color Sensors for Commodity Depth Cameras", Proceeding ICME '11 Proceedings of the 2011 IEEE International Conference on Multimedia and Expo, Jul. 11-15, 2011, pp. 1-6.

Calonder et al., "BRIEF: Binary Robust Independent Elementary Features", Lecture Notes in Computer Science, vol. 6314, Computer Vision—ECCV 2010, 11th European Conference on Computer Vision, Heraklion, Crete, Greece, Sep. 5-11, 2010, pp. 778-792.

* cited by examiner

METHOD AND APPARATUS FOR GENERATING ALIGNMENT MATRIX FOR CAMERA-RADAR SYSTEM

The present application claims priority to and the benefit of U.S. Provisional Patent Application Ser. No. 62/068,229, filed Oct. 24, 2014 and entitled AUTOMATED ONLINE CAMERA-RADAR CALIBRATION, the entirety of which is incorporated herein by reference.

TECHNICAL FIELD

This disclosure relates generally to generating an alignment matrix for alignment of image data and radar data for camera and radar subsystems of a camera-radar system. More specifically, this disclosure relates to an automated online alignment process that uses a camera-radar alignment controller to generate the matrix for image and radar data from the camera-radar system. The camera-radar system may be embedded in an end item product, such as passenger transport equipment, material transport and handling equipment, industrial equipment, farming and agriculture equipment, and robotic equipment. The camera-radar system may contribute to onboard operation, remote operation, and/or autonomous operation of the end item product. Calibration and alignment are used interchangeably in this disclosure to refer to alignment of the image and radar data.

BACKGROUND

Calibration and/or alignment are essential in any camera-radar system having a camera subsystem and a radar subsystem in which fusion between image data from the camera subsystem and radar data from the radar subsystem is desired. To calibrate and/or align a camera-radar system, point correspondences of features in the scene must be found between the image data and the radar data. Feature detection algorithms in camera images are well-known, but radar produces sparse object level data. This makes it very difficult to implement an online feature detection algorithm for the camera-radar system that can find correspondences in both the camera image and the radar image. Current solutions for camera-radar alignment do not have automated schemes for establishing point correspondences between the image and radar data or for aligning the image and radar data.

SUMMARY

In one aspect, a method of generating an alignment matrix for a camera-radar system is provided. In one embodiment, the method includes: receiving first radar data at a camera-radar alignment controller, the first radar data having been originated by a radar subsystem of a camera-radar system, wherein the first radar data is representative of a first area of interest within a field of view for the radar subsystem; receiving first image data at the camera-radar alignment controller, the first image data having been originated by a camera subsystem of the camera-radar system, wherein the first image data is representative of the first area of interest within a field of view for the camera subsystem; processing the first radar data at the camera-radar alignment controller to detect radar features within the first area of interest and to determine a first reflected radar point with horizontal, vertical, and distance dimensions in relation to the camera-radar system; processing the first image data at the camera-radar alignment controller to detect image features within the first area of interest and to determine a first centroid with horizontal and vertical dimensions in relation to the camera-radar system; and computing an alignment matrix at the camera-radar alignment controller for radar and image data from the camera-radar system based at least in part on a functional relationship between the horizontal, vertical, and distance dimensions for the first reflected radar point and the horizontal and vertical dimensions for the first centroid.

In another aspect, a camera-radar alignment controller for generating an alignment matrix for a camera-radar system is provided. In one embodiment, the camera-radar alignment controller includes: a radar data interface configured to receive first radar data originated by a radar subsystem of a camera-radar system, wherein the first radar data is representative of a first area of interest within a field of view for the radar subsystem; an image data interface configured to receive first image data originated by a camera subsystem of the camera-radar system, wherein the first image data is representative of the first area of interest within a field of view for the camera subsystem; and at least one processor configured to process the first radar data to detect radar features within the first area of interest and to determine a first reflected radar point with horizontal, vertical, and distance dimensions in relation to the camera-radar system. The at least one processor is configured to process the first image data to detect image features within the first area of interest and to determine a first centroid with horizontal and vertical dimensions in relation to the camera-radar system. The at least one processor is configured to compute an alignment matrix for radar and image data from the camera-radar system based at least in part on a functional relationship between the horizontal, vertical, and distance dimensions for the first reflected radar point and the horizontal and vertical dimensions for the first centroid.

In yet another aspect, a non-transitory computer-readable medium storing program instructions is provided. The program instructions, when executed by at least one processor, cause a camera-radar alignment controller to perform a method of generating an alignment matrix for a camera-radar system. In one embodiment, the method includes: receiving first radar data at the camera-radar alignment controller, the first radar data having been originated by a radar subsystem of a camera-radar system, wherein the first radar data is representative of a first area of interest within a field of view for the radar subsystem; receiving first image data at the camera-radar alignment controller, the first image data having been originated by a camera subsystem of the camera-radar system, wherein the first image data is representative of the first area of interest within a field of view for the camera subsystem; processing the first radar data at the camera-radar alignment controller to detect radar features within the first area of interest and to determine a first reflected radar point with horizontal, vertical, and distance dimensions in relation to the camera-radar system; processing the first image data at the camera-radar alignment controller to detect image features within the first area of interest and to determine a first centroid with horizontal and vertical dimensions in relation to the camera-radar system; and computing an alignment matrix at the camera-radar alignment controller for radar and image data from the camera-radar system based at least in part on a functional relationship between the horizontal, vertical, and distance dimensions for the first reflected radar point and the horizontal and vertical dimensions for the first centroid.

BRIEF DESCRIPTION OF THE DRAWINGS

In the drawings, like reference numerals refer to like elements throughout, and the various features are not necessarily drawn to scale.

DETAILED DESCRIPTION

This disclosure describes various embodiments of an online automated alignment scheme for image and radar data from camera and radar subsystems of a camera-radar system using a camera-radar alignment controller. The alignment scheme can be implemented while the camera-radar system is embedded in an end item product.

Figure 1:
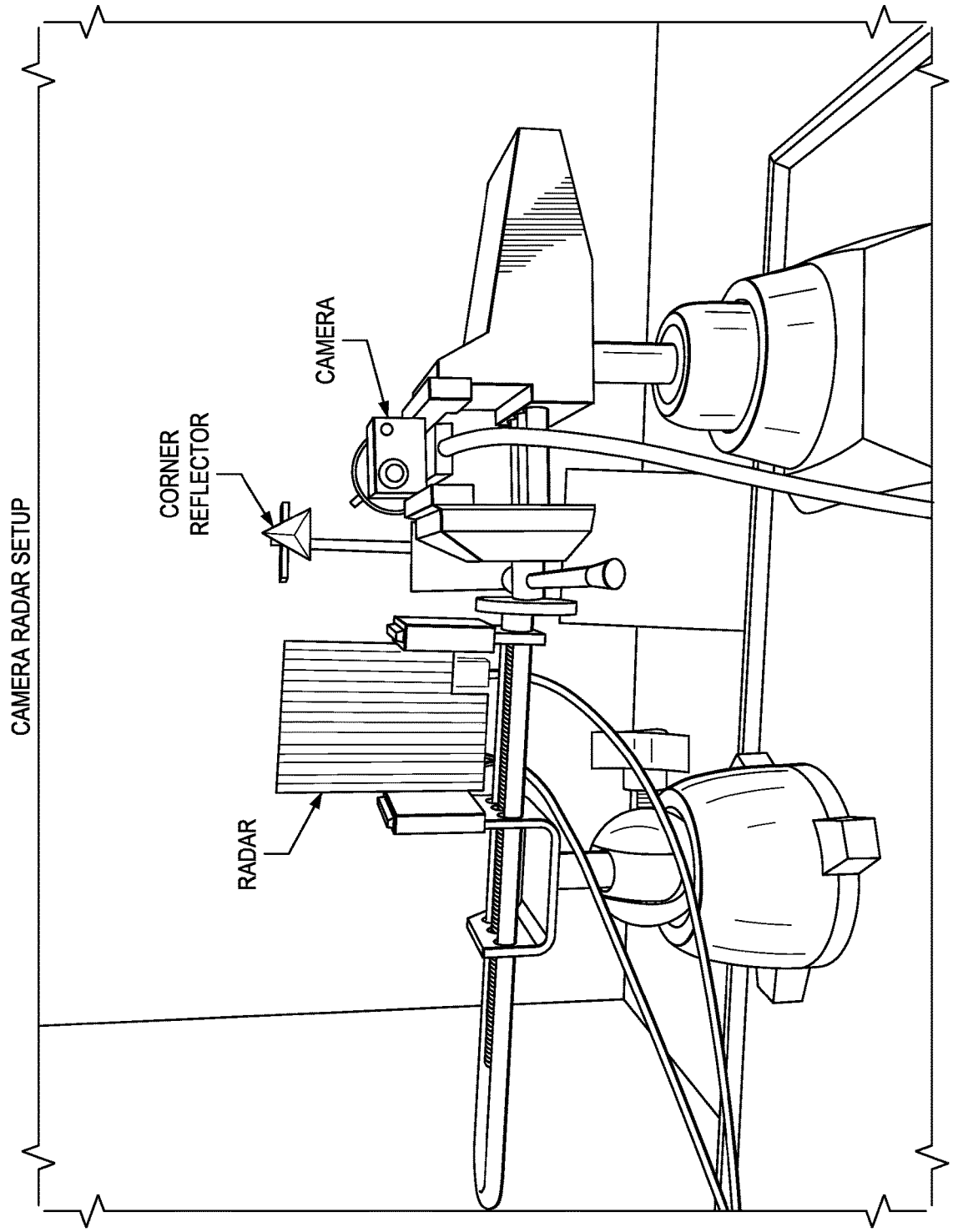
FIG. 1 provides an exemplary setup for alignment of camera and radar subsystems of an exemplary embodiment of a camera-radar system.
Figure 2:
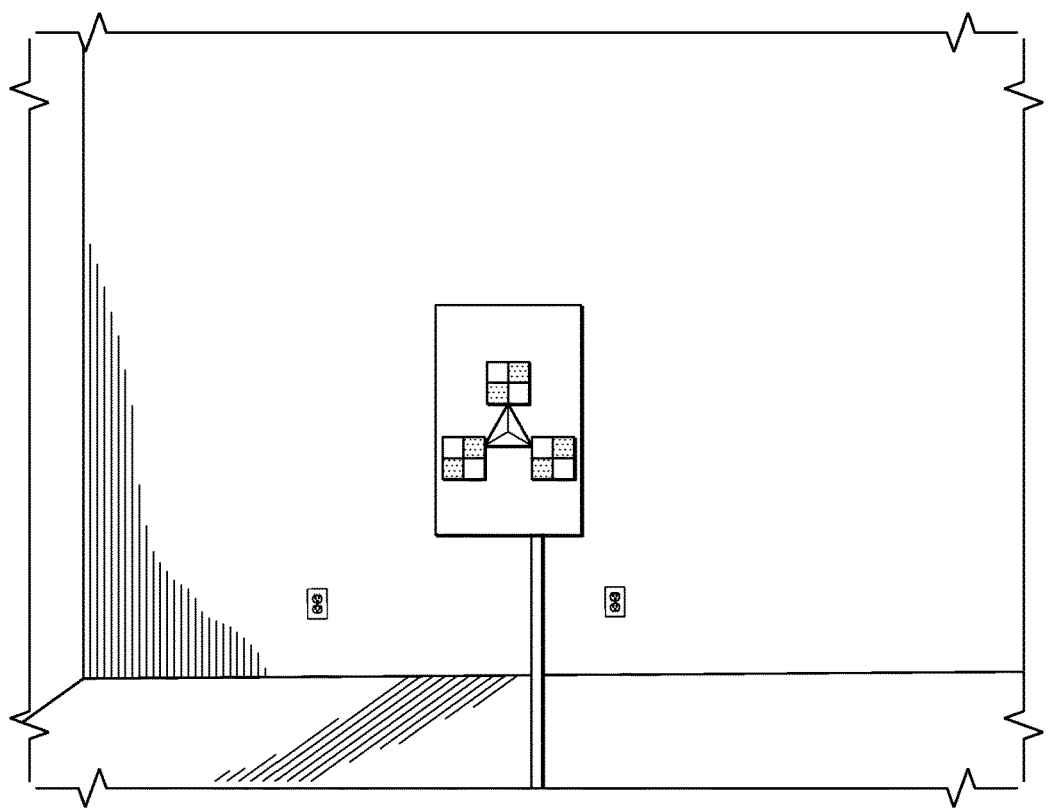
FIG. 2 provides an example of an image captured by a camera subsystem in conjunction with alignment of camera and radar subsystems.
Figure 3:
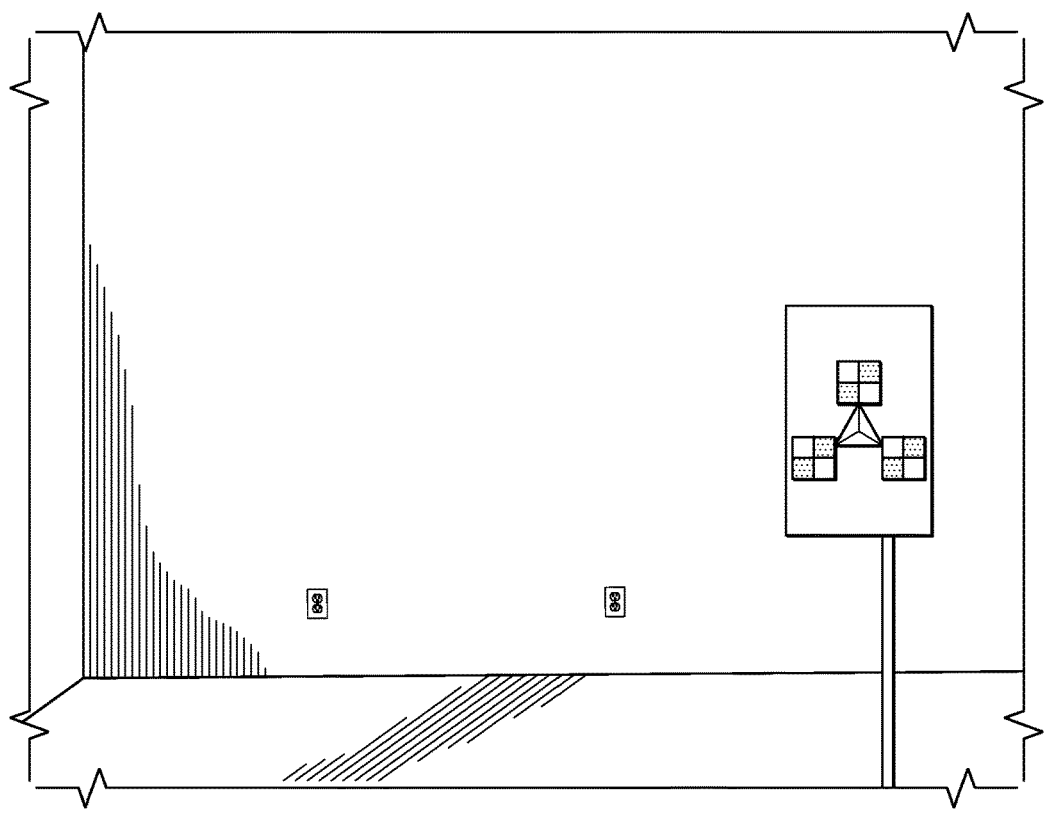
FIG. 3 provides an example of another image captured by a camera subsystem in conjunction with alignment of camera and radar subsystems.
Figure 4:
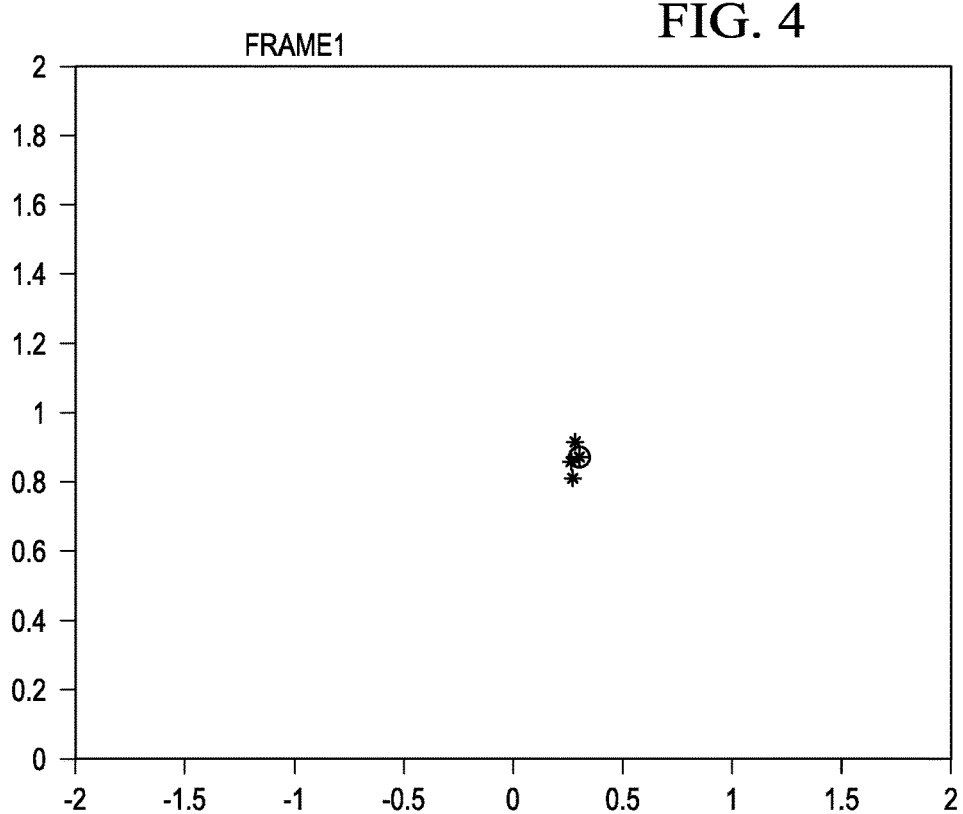
FIG. 4 provides an example of an image captured by a radar subsystem in conjunction with alignment of camera and radar subsystems.
Figure 5:
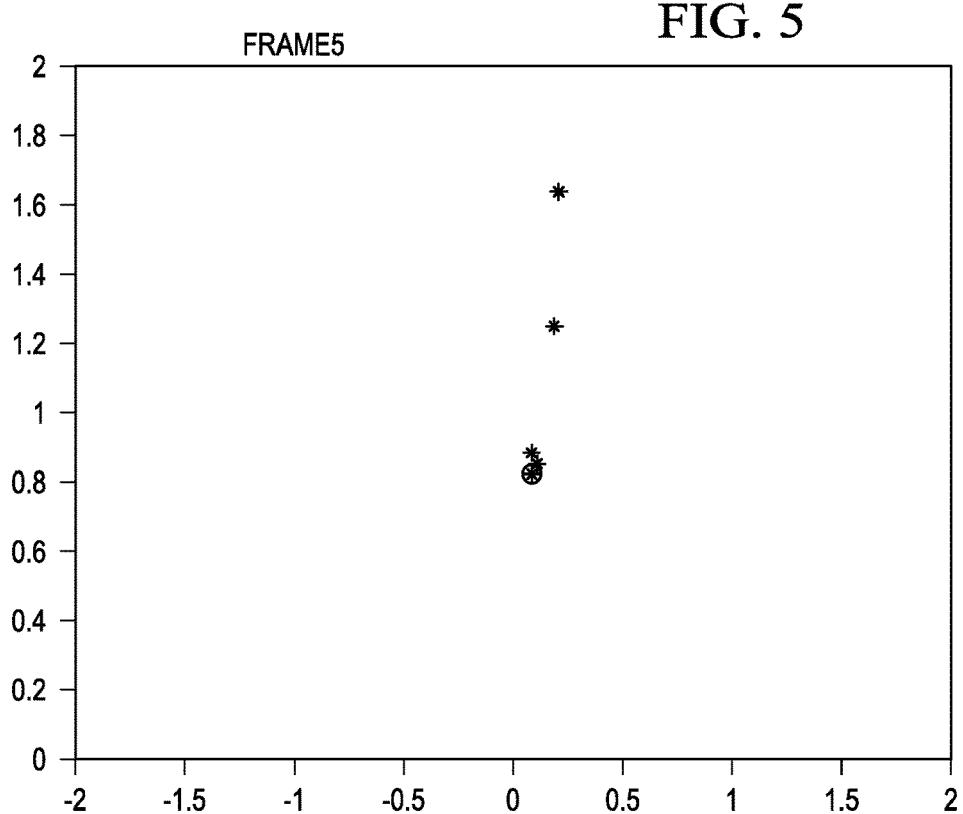
FIG. 5 provides another example of an image captured by a radar subsystem in conjunction with alignment of camera and radar subsystems.

With reference to FIG. 1, an exemplary setup for alignment of camera and radar subsystems of an exemplary embodiment of a camera-radar system is shown. The goal of camera-radar fusion is to map points detected by the radar subsystem onto the image from the camera subsystem. FIGS. 2 and 3 show examples of images captured by the camera subsystem. FIGS. 4 and 5 show corresponding radar detection for the scene by the radar subsystem. The radar detection plots in FIGS. 4 and 5 show the top-view of the scene.

Notably, it is a challenging task to establish point correspondences between the camera and radar subsystems based on the image and radar data such as that which was used to produce the images of FIGS. 2 and 3 and the radar plots of FIGS. 4 and 5. In the radar plots of FIGS. 4 and 5, the location with the highest signal amplitude is highlighted by the circle-asterisk symbol. These points correspond to the center of the corner reflector in the radar data. To enable detection of the center of the corner reflector in the camera image, a pattern image (i.e., chart) with unique image features is positioned around the corner reflector (see, e.g., FIGS. 2, 3, and 6).

Figure 6:
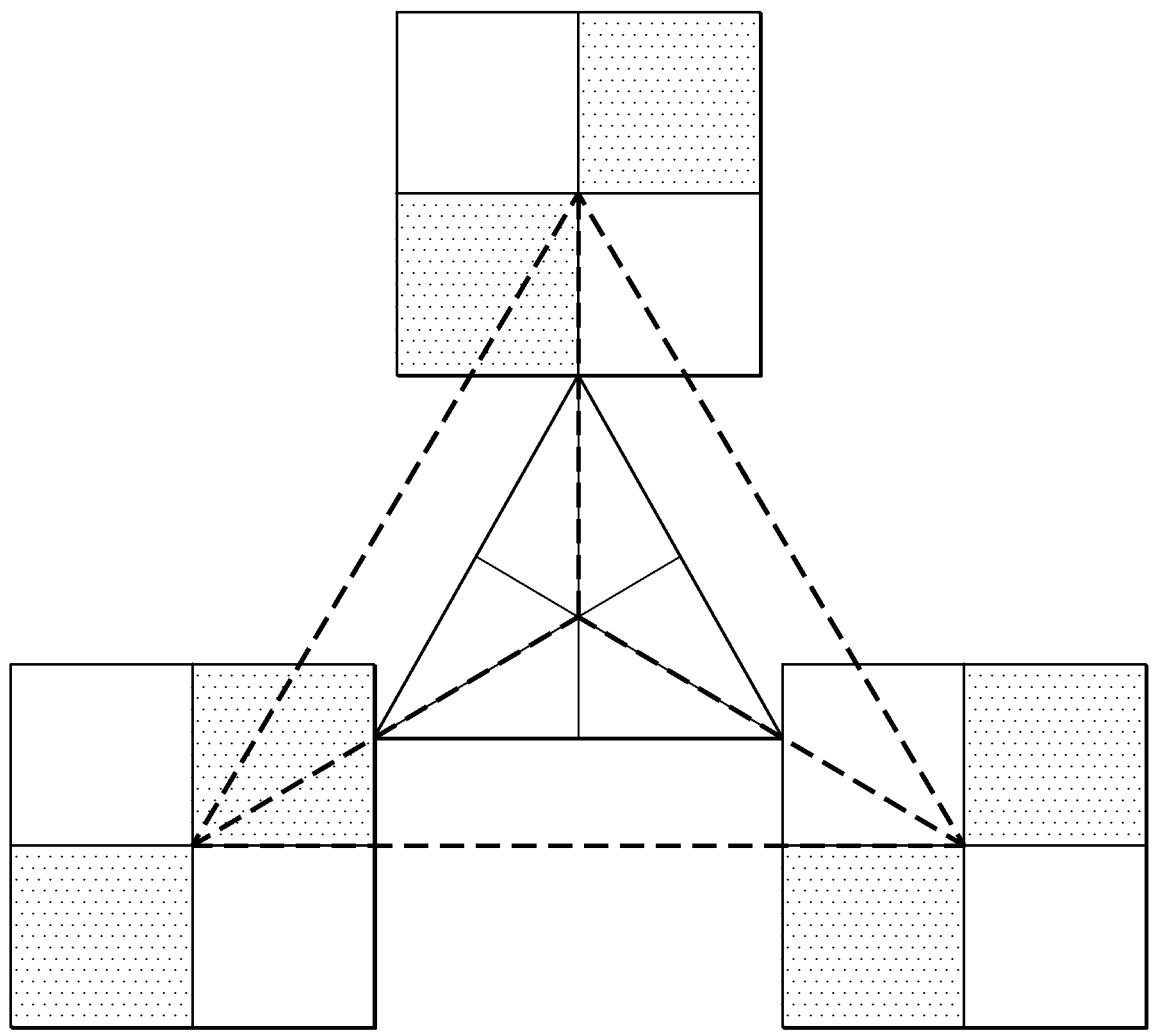
FIG. 6 provides an example of a pattern image with exemplary image features to be detected.

The exemplary pattern image exhibits image-detectable features such that a centroid of a triangle formed by the image-detectable features on the pattern image aligns with the center of the corner reflector. This facilitates establishing correspondence between the image data for the pattern image and the radar data for the corner reflector. FIG. 6 shows an illustration of the exemplary pattern image with annotations showing the triangle and centroid geometric relationships associated with the pattern image. The dashed lines indicate the triangle formed by the features and the solid lines indicate the location for the corner reflector.

A Harris corner detection algorithm can be used to detect features in the captured camera image. This is a well-known algorithm for feature detection. Any other feature detection algorithm can be used as well. After processing the image data using a feature detector, several image features will be detected in the image. To identify detected image features that correspond to the centers of the four-square checkerboard patterns in the pattern image, a Binary robust independent elementary features (BRIEF) algorithm can be used to determine scores and identify detected image features that match the four-square checkerboard patterns. BRIEF is a well-known metric for feature matching. For additional information on BRIEF, see Calonder et al, BRIEF: Binary Robust Independent Elementary Features, Computer Vision ECCV 2010, Proceedings of the 11$^{th}$ European Conference on Computer Vision, Part IV, Heraklion, Crete, Greece, Sep. 5-11, 2010, pp. 778-792, the contents of which are incorporated herein by reference. Any other feature matching metric may also be used. Typically, features are matched between two images. However, in this case, the pattern image that needs to be detected is know so the BRIEF score can be pre-calculated for the pattern image and image features that match this score can be identified.

In other embodiments, the arrangement shown FIGS. 2, 3, 6, and 7 with the three-surface corner reflector and the pattern image formed by the three checkerboard patterns arranged in an equilateral triangle can be modified to any suitable combination of various types of reflectors and various pattern images. For example, a four-surface corner reflector can be paired with a pattern image formed by four patterns arranged in a square. Moreover, other types of reflectors, such as a circular retroreflector with a parabolic surface, may be pair with a pattern image formed by three patterns arranged in an equilateral triangle, four patterns arranged in a square, five patterns arranged in a pentagon, six patterns arranged in a hexagon, eight patterns arranged in an octagon, or any number of patterns suitably arranged in a polygon such that the centroid of the patterns can be determined.

Figure 7:
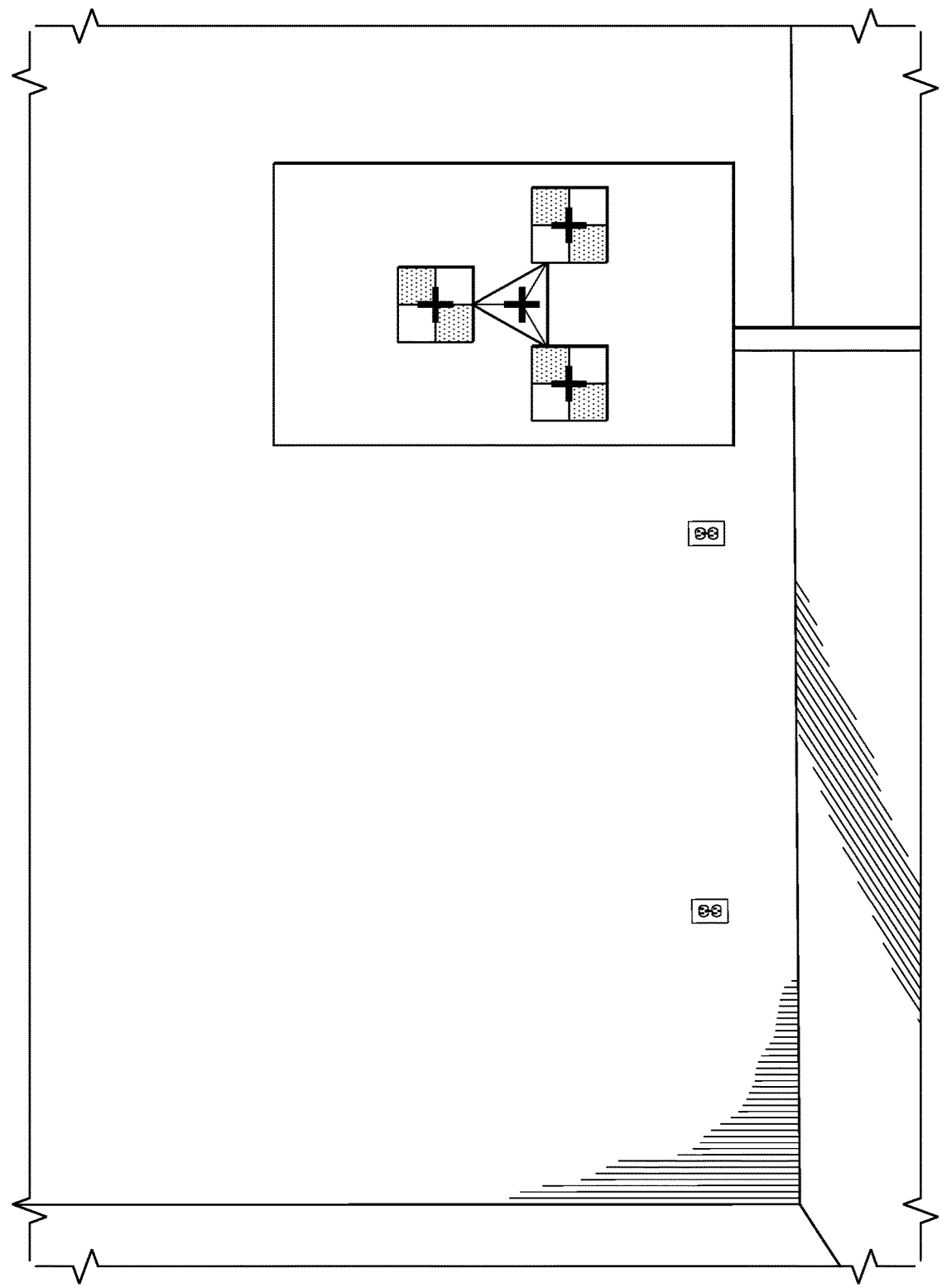
FIG. 7 provides an example of a radar corner reflector overlaid image features detected from an exemplary pattern image.

With reference to FIG. 7, an example of the detected image features from the pattern image are placed over the corner reflector in the image captured by the camera subsystem. Using the Harris corner detection algorithm, the centers of the four-square checkerboard patterns on the pattern image are detected. Using a geometric decomposition algorithm, the corresponding centroid of the triangle formed by four-square checkerboard patterns is detected. As shown, the center of the corner reflector is automatically identified by determining the centroid for the pattern image.

Several radar and camera images of the corner reflector and associated pattern image are captured at different locations in relation so horizontal, vertical, and distance dimensions from the camera-radar system. For example, at least four sets of images are preferred. More sets of images provide a more accurate alignment matrix. For each set of radar and camera images, the center of the corner reflector in the camera image and the radar image are identified. For example, the corner reflector and associated pattern image can be moved around the space around the camera-radar system that is within the field of view of both the camera and radar subsystems to capture the multiple sets of images at different locations. Alternatively, the same space can be populated with multiple corner reflectors and corresponding pattern images to provide multiple areas of interest in the same scene. Once correspondences between the image and radar data are established, an alignment matrix can be generated based on the image and radar data for the multiple sets of images for the different locations. Creation of the alignment matrix from these correspondences is a least square minimization problem. For additional information on least square minimization, see Zhang et al., Calibration Between Depth and Color Sensors for Commodity Depth Cameras, IEEE International Conference on Multimedia and Expo (ICME), Jul. 11-15, 2011, pp. 1-6, the contents of which are incorporated herein by reference.

Figure 8:
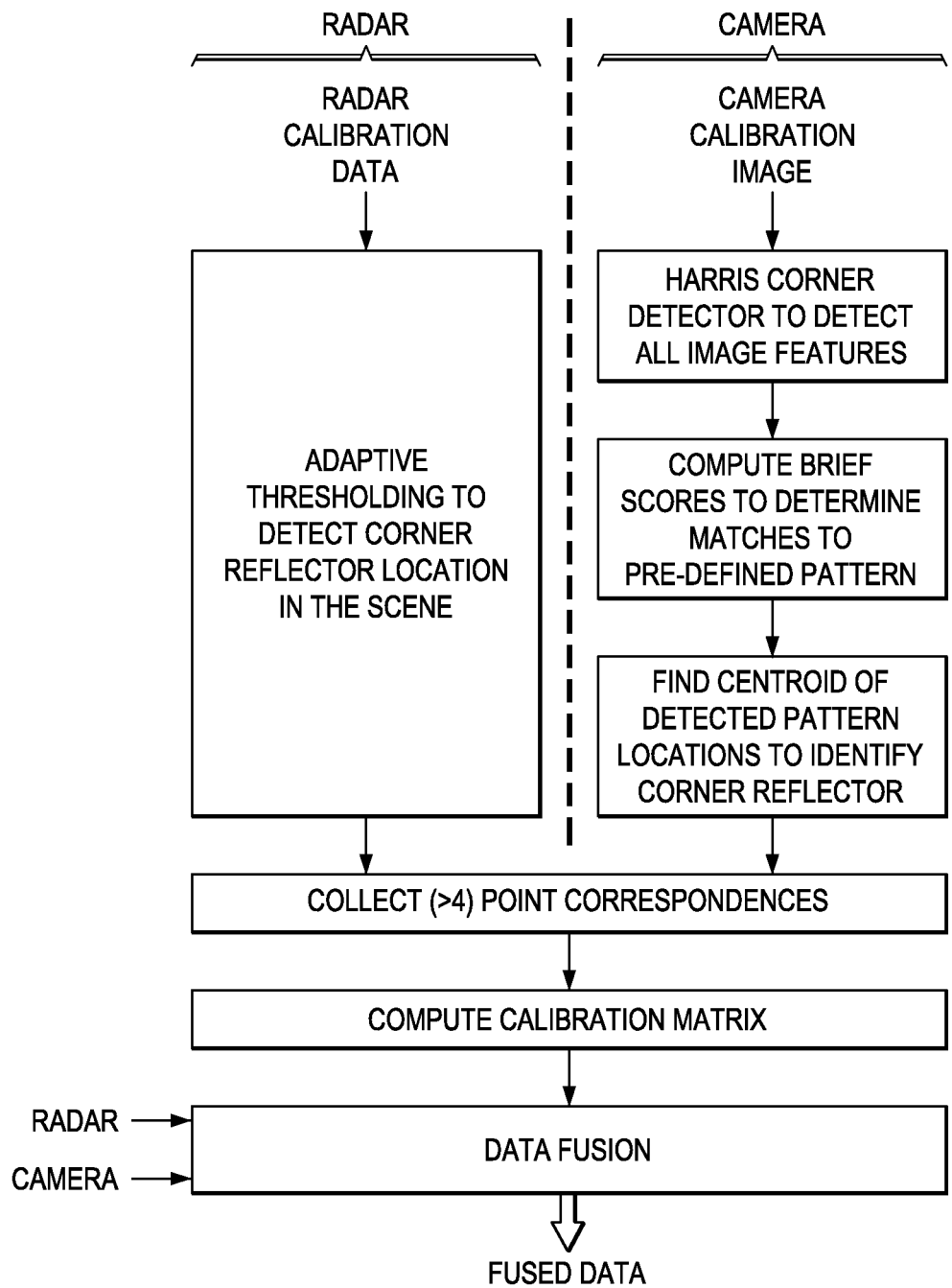
FIG. 8 provides an exemplary embodiment of a process for generating a calibration matrix for a camera-radar system.

With reference to FIG. 8, a high-level flowchart shows an exemplary embodiment of a process for generating a calibration matrix for a camera-radar system. For example, the automated radar camera calibration algorithm reflected by the flowchart may be implemented in a camera-radar alignment controller. In this embodiment, the camera-radar alignment controller receives radar calibration data from a radar subsystem and camera calibration data from a camera subsystem. The radar calibration data is processed using an adaptive thresholding algorithm to detect a radar corner reflector in the scene.

The camera calibration data is processed using a Harris corner detector to detect image features. The detected image features are processed using the BRIEF algorithm to compute BRIEF scores and determine matches to pre-defined patterns in a pattern image. The matched image features are processed using a geometric decomposition algorithm to find a centroid of the matched image features to identify the corresponding center of the corner reflector.

The receiving and processing of the radar calibration data and the camera calibration data is repeated for four or more point correspondences for which the corner reflector and pattern image are at different locations. The resulting centers of the corresponding corner reflector locations in the multiple locations are processed to compute the calibration matrix. Subsequently, radar and camera data from the radar and camera subsystems are processed using the calibration matrix to fuse the camera and radar data.

Figure 9:
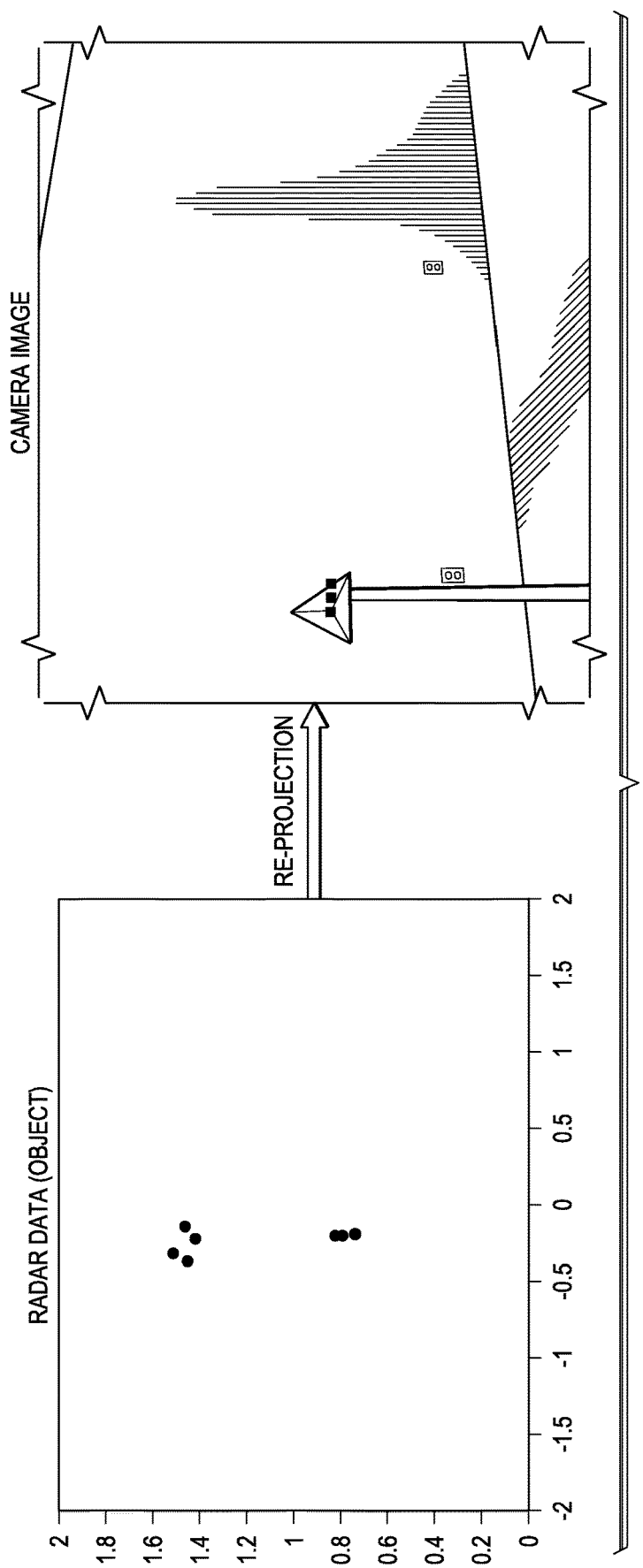
FIG. 9 provides an example re-projection of a reflected radar point on an exemplary camera image.

With reference to FIG. 9, an example of the re-projection of a radar detected point onto the camera image is shown. If there are multiple objects in the scene all the points detected in the radar can be projected back onto the camera image.

Figure 10:
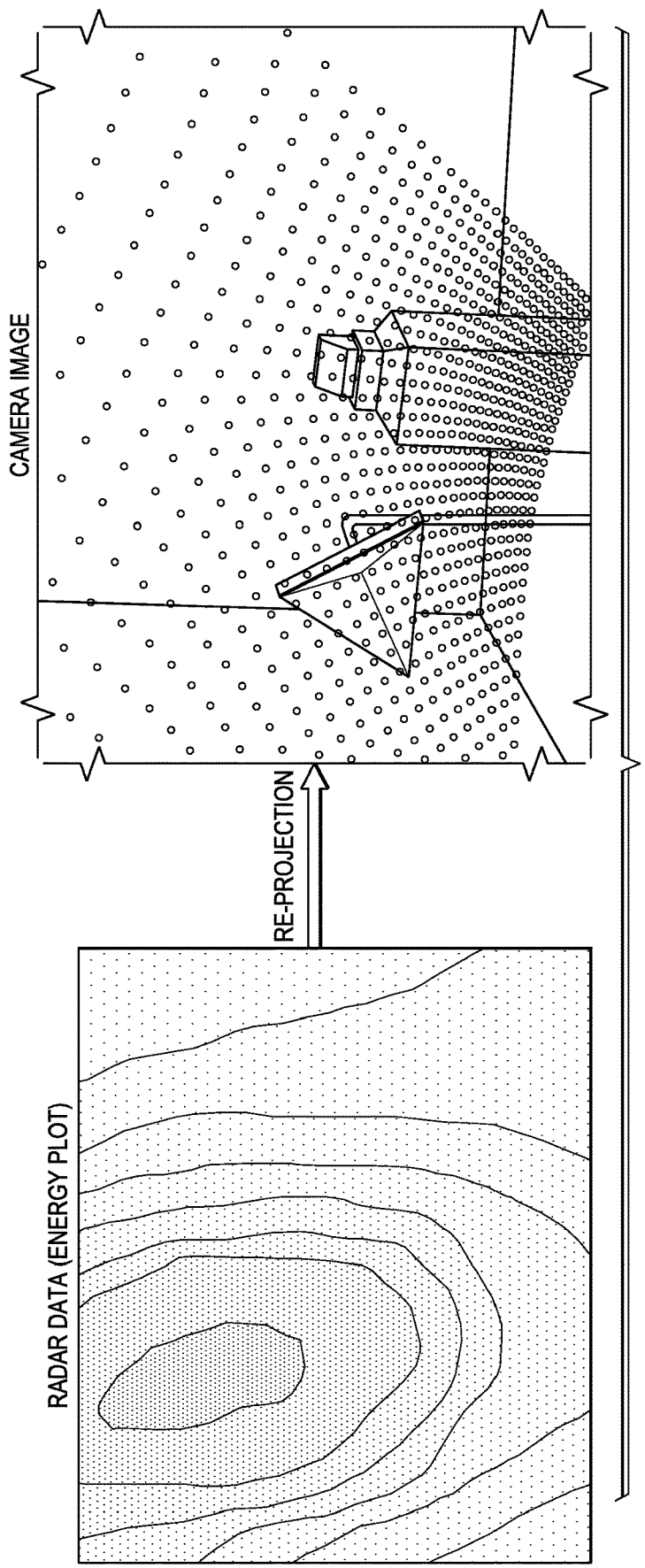
FIG. 10 provides an example re-projection of radar data on the exemplary camera image.

With reference to FIG. 10, the calibration matrix and associated camera-radar alignment can also be useful to create a data level fusion. The figure shows an example where dense radar measurements of the scene are mapped onto the camera image. Such data level fusion can be useful in vision algorithms that can benefit from co-located camera and radar measurements to improve robustness. The energy plot is a cross-section of a three dimensional volume of the scene with the darker radar symbols showing stronger refection associated with the corner reflector than the lighter radar symbols.

The various embodiments of the online calibration described herein can improve efficiency and create more accurate and reliable fusion algorithms. Typically, a one-time camera-radar physical location based calibration can generate large alignment errors. Thus, post-processing algorithms on fused radar-camera data have wide margins in detection algorithms to compensate for these errors. This can reduce the advantage of having a fusion system. With online calibration more accurate and reliable data alignment for higher level vision processing is provided.

Figure 11:
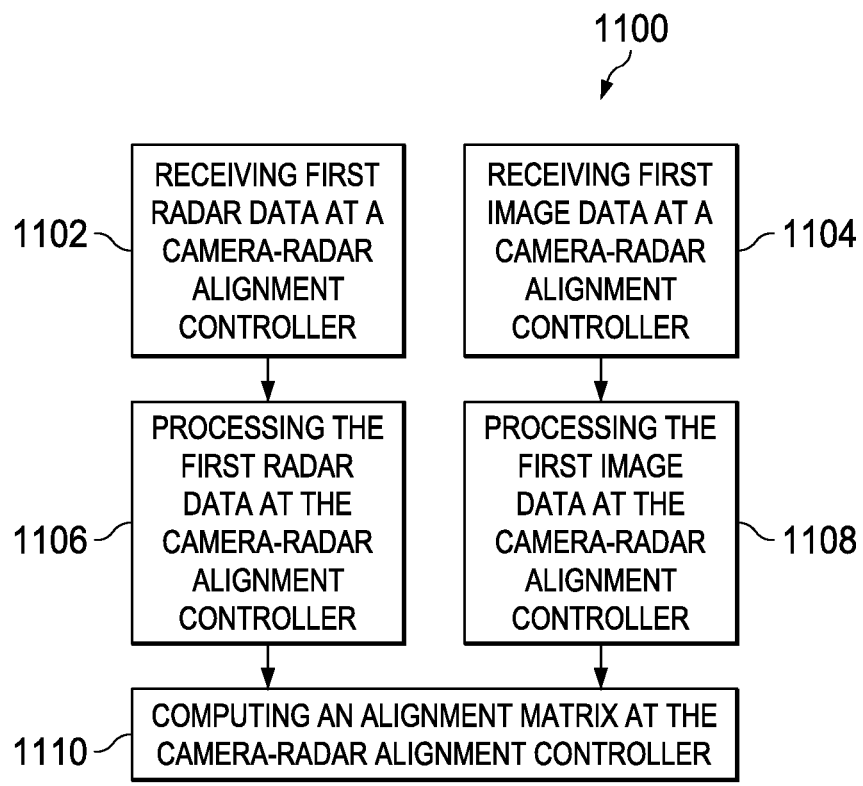
FIG. 11 is a flowchart of an exemplary embodiment of a process for generating an alignment matrix for a camera-radar system.

With reference to FIG. 11, an exemplary embodiment of a process 1100 for generating an alignment matrix for a camera-radar system begins at 1102 where first radar data is received at a camera-radar alignment controller. The first radar data having been originated by a radar subsystem of a camera-radar system. The first radar data is representative of a first area of interest within a field of view for the radar subsystem. First image data is received at the camera-radar alignment controller (1104). The first image data having been originated by a camera subsystem of the camera-radar system. The first image data is representative of the first area of interest within a field of view for the camera subsystem. At 1106, the first radar data is processed at the camera-radar alignment controller to detect radar features within the first area of interest and to determine a first reflected radar point with horizontal, vertical, and distance dimensions in relation to the camera-radar system. The first image data is processed at the camera-radar alignment controller to detect image features within the first area of interest and to determine a first centroid with horizontal and vertical dimensions in relation to the camera-radar system (1108). As shown, the receiving and processing of the first radar data can be performed in parallel with the receiving and processing of the first image data. Alternatively, the receiving and processing of the first radar data and the receiving and processing of the first image data can be offset in any suitable manner. The receiving and processing of the first radar data and the receiving and processing of the first image data can also be performed in series. At 1110, an alignment matrix is computed at the camera-radar alignment controller for radar and image data from the camera-radar system based at least in part on a functional relationship between the horizontal, vertical, and distance dimensions for the first reflected radar point and the horizontal and vertical dimensions for the first centroid.

In another embodiment, the process 1100 also includes receiving second radar data originated by the radar subsystem at the camera-radar alignment controller. The second radar data is representative of a second area of interest within the field of view for the radar subsystem. Second image data originated by the camera subsystem is also received at the camera-radar alignment controller. The second image data is representative of the second area of interest within the field of view for the camera subsystem. The second radar data is processed at the camera-radar alignment controller to detect radar features within the second area of interest and to determine a second reflected radar point with horizontal, vertical, and distance dimensions in relation to the camera-radar system. The second image data is processed at the camera-radar alignment controller to detect image features within the second area of interest and to determine a second centroid with horizontal and vertical dimensions in relation to the camera-radar system. Like the first radar and image data, the receiving and processing of the second radar data can be performed in parallel with the receiving and processing of the second image data. Alternatively, the receiving and processing of the second radar data and the receiving and processing of the second image data can be offset in any suitable manner. The receiving and processing of the second radar data and the receiving and processing of the second image data can also be performed in series. In any of these alternatives, computing the alignment matrix for the radar and image data is also based at least in part on a functional relationship between the horizontal, vertical, and distance dimensions for the second reflected radar point and the horizontal and vertical dimensions for the second centroid. In a further embodiment of the process 1100, computing the alignment matrix for the radar and image data is also based at least in part on a functional relationship between the dimensions associated with the first area of interest and the dimensions associated with the second area of interest.

In yet another embodiment, the process 1100 also includes repeating the receiving and processing of the first radar data for at least three additional radar data representative of a corresponding at least three additional areas of interest to determine a corresponding at least three additional reflected radar points. Each additional area of interest and the first area of interest are in different locations in relation to at least one of horizontal, vertical, and distance dimensions from the camera-radar system. The receiving and processing of the first image data is also repeated for at least three additional image data representative of the corresponding at least three additional areas of interest to determine a corresponding at least three additional centroids. Like the first radar and image data, the receiving and processing of the at least three additional radar data can be performed in parallel with the receiving and processing of the at least three additional image data. Alternatively, the receiving and processing of the at least three additional radar data and the receiving and processing of the at least three additional image data can be offset in any suitable manner. The receiving and processing of the at least three additional radar data and the receiving and processing of the at least three additional image data can also be performed in series. In any of these alternatives, computing the alignment matrix for the radar and image data is also based at least in part on functional relationships between the horizontal, vertical, and distance dimensions for each additional reflected radar point and the horizontal and vertical dimensions for the corresponding additional centroid. In a further embodiment of the process 1100, computing the alignment matrix for the radar and image data is also based at least in part on functional relationships between the dimensions associated with each of the first and additional areas of interest and the dimensions associated with other corresponding areas of interest among the first and additional areas of interest.

In still another embodiment, the camera-radar system may include a combination of multiple radar subsystems oriented in the same direction as the camera subsystem such that the field of view of the multiple radar subsystems and the camera subsystem at least overlap in relation to certain areas of interest. The camera-radar alignment controller may receive radar data from each radar subsystem and image data from the camera subsystem, independently process the radar and image data for each combination, and compute an alignment matrix for each combination. In this embodiment, the camera-radar alignment controller may independently operate in the same manner described herein for each combination of radar and camera subsystems.

In still yet another embodiment, the camera-radar system may include a combination of multiple camera subsystems oriented in the same direction as the radar subsystem such that the field of view of the multiple camera subsystems and the radar subsystem at least overlap in relation to certain areas of interest. The camera-radar alignment controller may receive image data from each camera subsystem and radar data from the radar subsystem, independently process the radar and image data for each combination, and compute an alignment matrix for each combination. In this embodiment, the camera-radar alignment controller may independently operate in the same manner described herein for each combination of radar and camera subsystems.

In yet another embodiment, the camera-radar system may include multiple combinations of radar and camera subsystems used for different purposes and/or oriented in different directions. For example, the camera-radar system may be onboard a vehicle with first radar and camera subsystems facing forward in relation to the driver, second radar and camera subsystems facing left in relation to the driver, third radar and camera subsystems facing right in relation to the driver, and fourth radar and camera subsystems facing to the rear in relation to the driver. The camera-radar alignment controller may receive radar and image data from each combination of radar and camera subsystems independently process the radar and image data for each combination, and compute an alignment matrix for each combination. In this embodiment, the camera-radar alignment controller may independently operate in the same manner described herein for each combination of radar and camera subsystems.

In still another embodiment of the process 1100, in conjunction with origination of the first radar data, a radar retroreflector with radar-detectable features is located within the first area of interest. The radar retroreflector is oriented in relation to the radar subsystem such that the radar-detectable features are detectable in the first radar data and indicative of an actual center for the radar retroreflector. In a further embodiment of the process 1100, in conjunction with origination of the first radar data, the radar retroreflector includes a radar corner reflector or any suitable radar retroreflector.

In another further embodiment of the process 1100, in conjunction with origination of the first radar data and the first image data, a pattern image with camera-detectable image features is located within the first area of interest. The pattern image is oriented in relation to the camera subsystem such that the camera-detectable image features are detectable in the first image data and indicative of an actual center for the pattern image. The pattern image is located in relation to the radar retroreflector such that the actual center for the pattern image and the actual center for the radar retroreflector are aligned. In an even further embodiment of the process 1100, in conjunction with origination of the first image data, the camera-detectable image features include a plurality of corner features arranged at equal distances from the actual center for the pattern image. In other embodiments, the camera-detectable image features may include a plurality of any suitable camera-detectable image features in any suitable combination provided that some predetermined aspect of the camera-detectable image features are arranged at equal distances from the actual center for the pattern image. In a still even further embodiment of the process 1100, in conjunction with origination of the first image data, the plurality of camera-detectable features include three corner features arranged in an equilateral triangle. In a still yet even further embodiment of the process 1100, in conjunction with origination of the first image data, each corner feature includes at least four squares of alternating colors forming a checkerboard pattern. In other embodiments, each corner feature includes any suitable combination of geometric shapes that define the corresponding corner feature.

In still yet another embodiment, the process 1100 also includes storing the alignment matrix in a storage device associated with the camera-radar alignment controller. The storage device may be internal to the camera-radar alignment controller, external to the camera-radar alignment controller, or any suitable combination of internal and external storage devices. In another embodiment, the process 1100 also includes fusing at least a portion of the first radar data with the first image data using the alignment matrix to align the corresponding first radar data with the first image data and produce fused radar-image data for the first area of interest. In a further embodiment, the process 1100 also includes providing the fused radar-image data to a display device associated with the camera-radar alignment controller. The display device may be internal to the camera-radar alignment controller, external to the camera-radar alignment controller, or any suitable combination of internal and external display devices.

Figure 12:
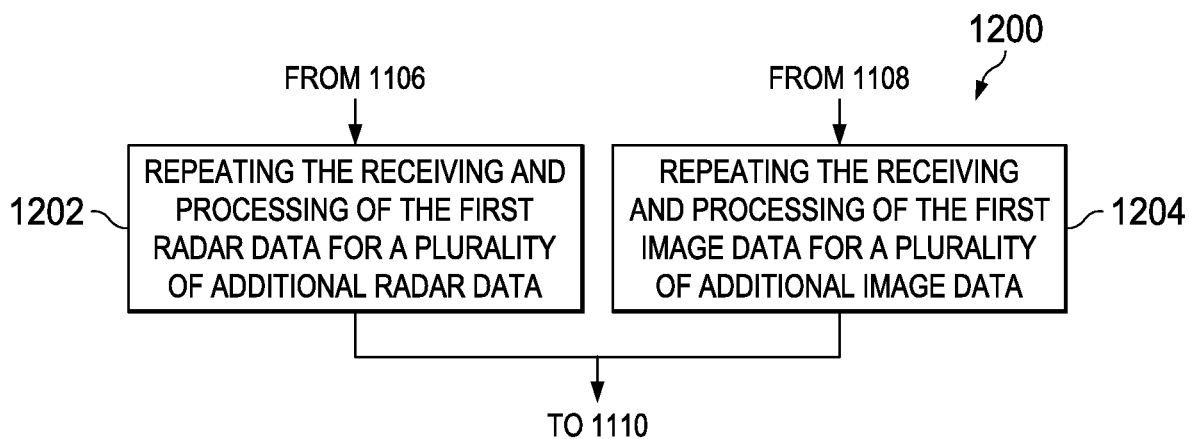
FIG. 12, in combination with FIG. 11, is a flowchart of another exemplary embodiment of a process for generating an alignment matrix for a camera-radar system.

With reference to FIGS. 11 and 12, another embodiment of a process 1200 for generating an alignment matrix for a camera-radar system includes the process 1100 of FIG. 11. At 1202, the process 1200 includes repeating the receiving (1102) and processing (1106) of the first radar data for a plurality of additional radar data representative of a corresponding plurality of additional areas of interest to determine a corresponding plurality of additional reflected radar points. Each additional area of interest and the first area of interest are in different locations in relation to at least one of horizontal, vertical, and distance dimensions from the camera-radar system. At 1204, the process 1200 includes repeating the receiving (1104) and processing (1108) of the first image data for a plurality of additional image data representative of the corresponding plurality of additional areas of interest to determine a corresponding plurality of additional centroids. After 1202 and 1204, the process 1200 returns to 1110 where computing the alignment matrix for the radar and image data is also based at least in part on functional relationships between the horizontal, vertical, and distance dimensions for each additional reflected radar point and the horizontal and vertical dimensions for the corresponding additional centroid. In a further embodiment of the process 1200, computing the alignment matrix for the radar and image data is also based at least in part on functional relationships between the dimensions associated with each of the first and additional areas of interest and the dimensions associated with other corresponding areas of interest among the first and additional areas of interest.

Figure 13:
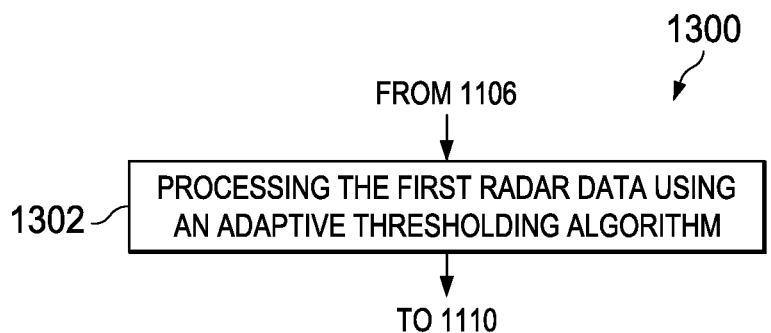
FIG. 13, in combination with FIG. 11, is a flowchart of yet another exemplary embodiment of a process for generating an alignment matrix for a camera-radar system.

With reference to FIGS. 11 and 13, another embodiment of a process 1300 for generating an alignment matrix for a camera-radar system continues from 1106 of the process 1100 of FIGS. 11 to 1302 where the first radar data is processed using an adaptive thresholding algorithm to detect the radar features within the first area of interest and to determine the first reflected radar point. In other embodiments, the first radar data can be processed using any suitable combination of algorithms suitable for detecting the radar features within the first area of interest and for determining the first reflected radar point. After 1302, the process 1300 returns to 1110 for computing the alignment matrix.

Figure 14:
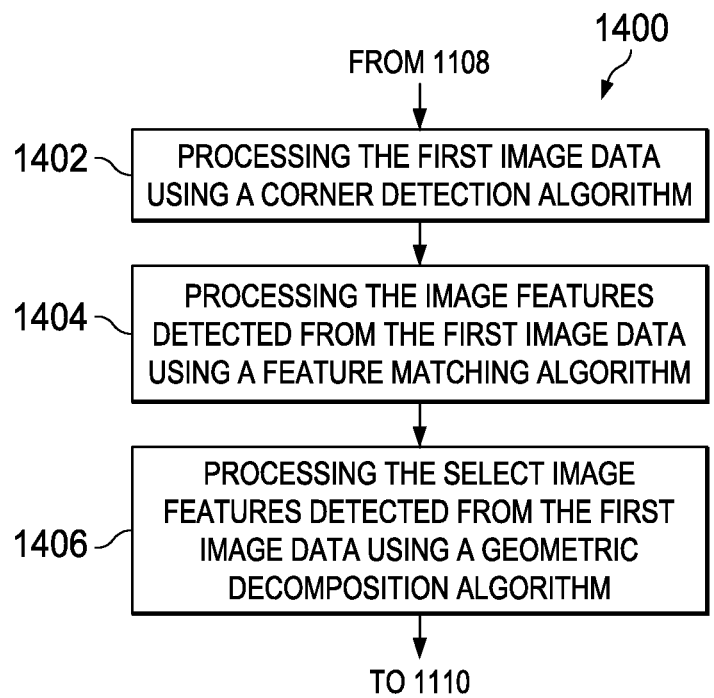
FIG. 14, in combination with FIG. 11, is a flowchart of still another exemplary embodiment of a process for generating an alignment matrix for a camera-radar system.

With reference to FIGS. 11 and 14, another embodiment of a process 1400 for generating an alignment matrix for a camera-radar system continues from 1108 of the process 1100 of FIGS. 11 to 1402 where the first image data is processed using a corner detection algorithm to detect the image features within the first area of interest. In other embodiments, the first image data can be processed using any suitable combination of algorithms suitable for detecting the image features within the first area of interest. At 1404, the image features detected from the first image data are processed using a feature matching algorithm to identify select image features that match predetermined patterns within the first area of interest. In other embodiments, the detected image features can be processed using any suitable combination of algorithms suitable for identifying select image features that match predetermined patterns within the first area of interest. At 1406, the select image features detected from the first image data are processed using a geometric decomposition algorithm to determine the first centroid. In other embodiments, the select image features can be processed using any suitable combination of algorithms suitable for determining the first centroid. In a further embodiment of the process 1400, the corner detection algorithm of 1402 includes a Harris corner detector algorithm or any suitable corner detection algorithm. In another further embodiment of the process 1400, the feature matching algorithm of 1404 includes a binary robust independent elementary features (BRIEF) algorithm or any suitable feature matching algorithm.

Figure 15:
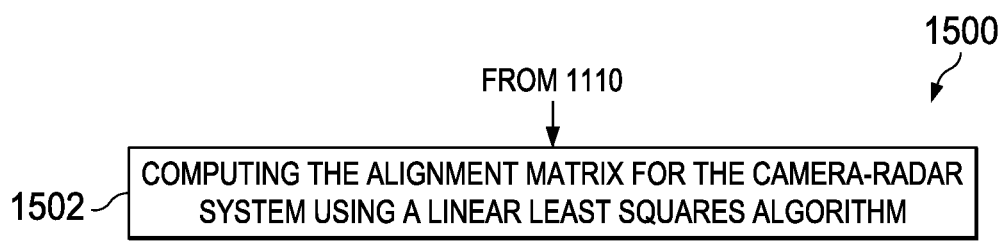
FIG. 15, in combination with FIG. 11, is a flowchart of still yet another exemplary embodiment of a process for generating an alignment matrix for a camera-radar system.

With reference to FIGS. 11 and 15, another embodiment of a process 1500 for generating an alignment matrix for a camera-radar system continues from 1110 of the process 1100 of FIGS. 11 to 1502 where the alignment matrix for the camera-radar system is computed using a linear least squares algorithm based at least in part on the functional relationship between the horizontal, vertical, and distance dimensions for the first reflected radar point and the horizontal and vertical dimensions for the first centroid. In other embodiments, the alignment matrix can be computed using any suitable combination of algorithms suitable for performing a regression analysis that correlates the three dimensions for the first radar data centroid with the two dimensions for the first centroid. In a further embodiment of the process 1500, the linear least squares algorithm includes a direct linear transformation (DLT) algorithm or any suitable linear least squares algorithm.

Figure 16:
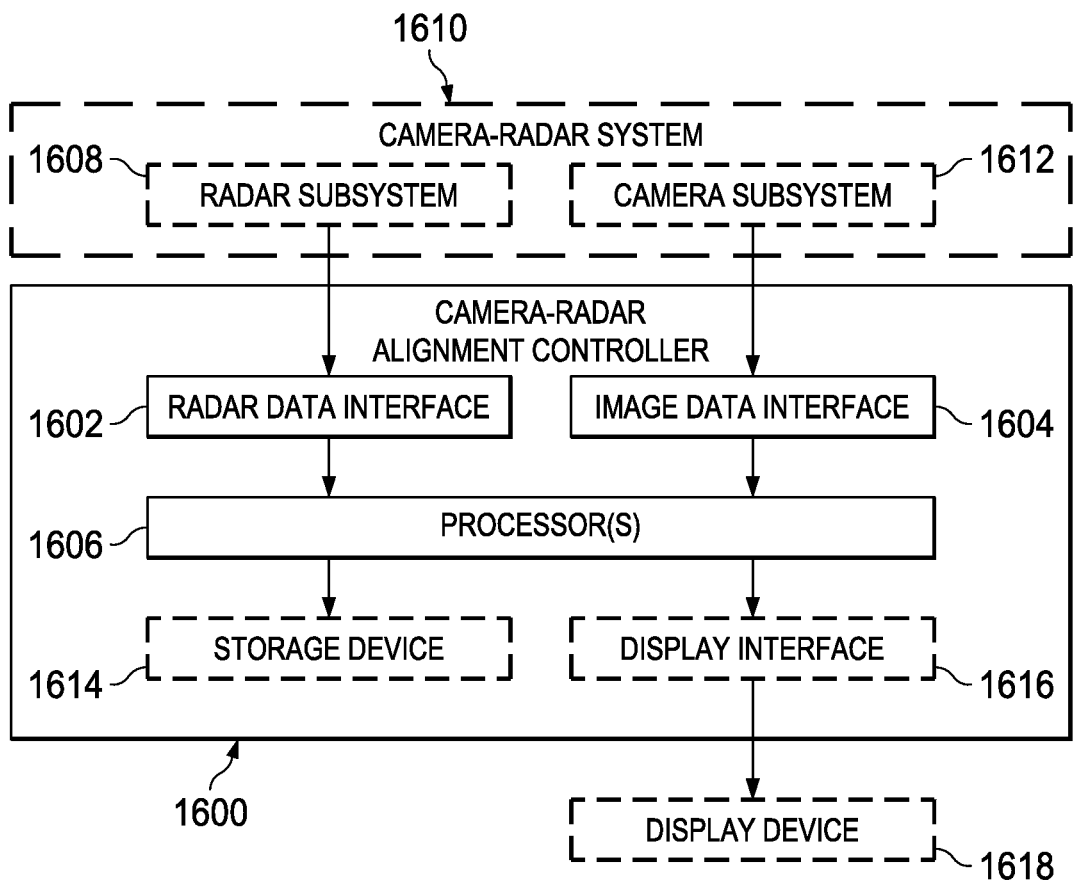
FIG. 16 is a block diagram of an exemplary embodiment of a camera-radar alignment controller for generating an alignment matrix for a camera-radar system.

With reference to FIG. 16, an exemplary embodiment of a camera-radar alignment controller 1600 for generating an alignment matrix for a camera-radar system includes a radar data interface 1602, an image data interface 1604, and at least one processor 1606. The radar data interface 1602 configured to receive first radar data originated by a radar subsystem 1608 of a camera-radar system 1610. The first radar data is representative of a first area of interest within a field of view for the radar subsystem 1608. The image data interface 1604 configured to receive first image data originated by a camera subsystem 1612 of the camera-radar system 1610. The first image data is representative of the first area of interest within a field of view for the camera subsystem 1612. The at least one processor 1606 configured to process the first radar data to detect radar features within the first area of interest and to determine a first reflected radar point with horizontal, vertical, and distance dimensions in relation to the camera-radar system 1610. The at least one processor 1606 is configured to process the first image data to detect image features within the first area of interest and to determine a first centroid with horizontal and vertical dimensions in relation to the camera-radar system 1610. The at least one processor 1606 is configured to compute an alignment matrix for radar and image data from the camera-radar system 1610 based at least in part on a functional relationship between the horizontal, vertical, and distance dimensions for the first reflected radar point and the horizontal and vertical dimensions for the first centroid. In other examples, the at least one process 1606 can be any suitable processor, electronic logic circuit, electronic component circuit, or combination thereof whether implemented as a single integrated circuit (IC), multiple ICs, a single circuit card, multiple circuit cards, or any suitable arrangement of components, circuits, and circuit cards.

In another embodiment of the camera-radar alignment controller 1600, the radar data interface 1602 is configured to receive second radar data originated by the radar subsystem 1608. The second radar data is representative of a second area of interest within the field of view for the radar subsystem 1608. The image data interface 1604 is configured to receive second image data originated by the camera subsystem 1612. The second image data is representative of the second area of interest within the field of view for the camera subsystem 1612. The at least one processor 1606 is configured to process the second radar data to detect radar features within the second area of interest and to determine a second reflected radar point with horizontal, vertical, and distance dimensions in relation to the camera-radar system 1610. The at least one processor 1606 is configured to process the second image data to detect image features within the second area of interest and to determine a second centroid with horizontal and vertical dimensions in relation to the camera-radar system 1610. The at least one processor 1606 is configured to compute the alignment matrix for the radar and image data based at least in part on a functional relationship between the horizontal, vertical, and distance dimensions for the second reflected radar point and the horizontal and vertical dimensions for the second centroid. In a further embodiment of the camera-radar alignment controller 1600, the at least one processor 1606 is configured to compute the alignment matrix for the radar and image data based at least in part on a functional relationship between the dimensions associated with the first area of interest and the dimensions associated with the second area of interest.

In yet another embodiment of the camera-radar alignment controller 1600, the radar data interface 1602 and the at least one processor 1606 are configured to repeat the receiving and processing of the first radar data for a plurality of additional radar data representative of a corresponding plurality of additional areas of interest to determine a corresponding plurality of additional reflected radar points. Each additional area of interest and the first area of interest are in different locations in relation to at least one of horizontal, vertical, and distance dimensions from the camera-radar system 1610. The image data interface 1604 and the at least one processor 1606 are configured to repeat the receiving and processing of the first image data for a plurality of additional image data representative of the corresponding plurality of additional areas of interest to determine a corresponding plurality of additional centroids. The at least one processor 1606 is configured to compute the alignment matrix for the radar and image data based at least in part on functional relationships between the horizontal, vertical, and distance dimensions for each additional reflected radar point and the horizontal and vertical dimensions for the corresponding additional centroid. In a further embodiment of the camera-radar alignment controller 1600, the at least one processor 1606 is configured to compute the alignment matrix for the radar and image data based at least in part on functional relationships between the dimensions associated with each of the first and additional areas of interest and the dimensions associated with other corresponding areas of interest among the first and additional areas of interest.

In still another embodiment of the camera-radar alignment controller 1600, the radar data interface 1602 and the at least one processor 1606 are configured to repeat the receiving and processing of the first radar data for at least three additional radar data representative of a corresponding at least three additional areas of interest to determine a corresponding at least three additional reflected radar points. Each additional area of interest and the first area of interest are in different locations in relation to at least one of horizontal, vertical, and distance dimensions from the camera-radar system 1610. The image data interface 1604 and the at least one processor 1606 are configured to repeat the receiving and processing of the first image data for at least three additional image data representative of the corresponding at least three additional areas of interest to determine a corresponding at least three additional centroids. The at least one processor 1606 is configured to compute the alignment matrix for the radar and image data based at least in part on functional relationships between the horizontal, vertical, and distance dimensions for each additional reflected radar point and the horizontal and vertical dimensions for the corresponding additional centroid. In a further embodiment of the camera-radar alignment controller 1600, the at least one processor 1606 is configured to compute the alignment matrix for the radar and image data based at least in part on functional relationships between the dimensions associated with each of the first and additional areas of interest and the dimensions associated with other corresponding areas of interest among the first and additional areas of interest.

In still yet another embodiment, the camera-radar system 1610 may include a combination of multiple radar subsystems 1608 oriented in the same direction as the camera subsystem 1612 such that the field of view of the multiple radar subsystems 1608 and the camera subsystem 1612 at least overlap in relation to certain areas of interest. The camera-radar alignment controller 1600 may receive radar data from each radar subsystem 1608 and image data from the camera subsystem 1612, independently process the radar and image data for each combination, and compute an alignment matrix for each combination. In this embodiment, the camera-radar alignment controller 1600 may independently operate in the same manner described herein for each combination of radar and camera subsystems 1608, 1612.

In another embodiment, the camera-radar system 1610 may include a combination of multiple camera subsystems 1612 oriented in the same direction as the radar subsystem 1608 such that the field of view of the multiple camera subsystems 1612 and the radar subsystem 1608 at least overlap in relation to certain areas of interest. The camera-radar alignment controller 1600 may receive image data from each camera subsystem 1612 and radar data from the radar subsystem 1608, independently process the radar and image data for each combination, and compute an alignment matrix for each combination. In this embodiment, the camera-radar alignment controller 1600 may independently operate in the same manner described herein for each combination of radar and camera subsystems 1608, 1612.

In yet another embodiment, the camera-radar system 1610 may include multiple combinations of radar and camera subsystems 1608, 1612 used for different purposes and/or oriented in different directions. For example, the camera-radar system 1610 may be onboard a vehicle with first radar and camera subsystems 1608, 1612 facing forward in relation to the driver, second radar and camera subsystems 1608, 1612 facing left in relation to the driver, third radar and camera subsystems 1608, 1612 facing right in relation to the driver, and fourth radar and camera subsystems 1608, 1612 facing to the rear in relation to the driver. The camera-radar alignment controller 1600 may receive radar and image data from each combination of radar and camera subsystems 1608, 1612, independently process the radar and image data for each combination, and compute an alignment matrix for each combination. In this embodiment, the camera-radar alignment controller 1600 may independently operate in the same manner described herein for each combination of radar and camera subsystems 1608, 1612.

In still yet another embodiment of the camera-radar alignment controller 1600, the at least one processor 1606 is configured to process the first radar data using an adaptive thresholding algorithm to detect the radar features within the first area of interest and to determine the first reflected radar point. In other embodiments, the first radar data can be processed using any suitable combination of algorithms suitable for detecting the radar features within the first area of interest and for determining the first reflected radar point.

In another embodiment of the camera-radar alignment controller 1600, the at least one processor 1606 is configured to process the first image data using a corner detection algorithm to detect the image features within the first area of interest. In other embodiments, the first image data can be processed using any suitable combination of algorithms suitable for detecting the image features within the first area of interest. In a further embodiment of the camera-radar alignment controller 1600, the at least one processor 1606 is configured to process the image features detected from the first image data using a feature matching algorithm to identify select image features that match predetermined patterns within the first area of interest. In other embodiments, the detected image features can be processed using any suitable combination of algorithms suitable for identifying select image features that match predetermined patterns within the first area of interest. In an even further embodiment of the camera-radar alignment controller 1600, the at least one processor 1606 is configured to process the select image features detected from the first image data using a geometric decomposition algorithm to determine the first centroid. In other embodiments, the select image features can be processed using any suitable combination of algorithms suitable for determining the first centroid.

In yet another embodiment of the camera-radar alignment controller 1600, the at least one processor 1606 is configured to compute the alignment matrix for the camera-radar system using a linear least squares algorithm based at least in part on the functional relationship between the horizontal, vertical, and distance dimensions for the first reflected radar point and the horizontal and vertical dimensions for the first centroid. In other embodiments, the alignment matrix can be computed using any suitable combination of algorithms suitable for performing a regression analysis that correlates the three dimensions for the first radar data centroid with the two dimensions for the first centroid.

In still another embodiment, the camera-radar alignment controller 1600 also includes a storage device 1614 configured to store the alignment matrix. The storage device 1614 may be internal to the camera-radar alignment controller 1600 (as shown), external to the camera-radar alignment controller (not shown), or any suitable combination of internal and external storage devices (not shown).

In still yet another embodiment of the camera-radar alignment controller 1600, the at least one processor 1606 is configured to fuse at least a portion of the first radar data with the first image data using the alignment matrix to align the corresponding first radar data with the first image data and produce fused radar-image data for the first area of interest. In a further embodiment, the camera-radar alignment controller 1600 also includes a display interface 1616 configured to provide the fused radar-image data to a display device 1618 associated with the camera-radar alignment controller 1600. The display device 1618 may be external to the camera-radar alignment controller 1600 (as shown), internal to the camera-radar alignment controller (not shown), or any suitable combination of internal and external display devices (not shown).

With reference to FIGS. 11-15, various exemplary embodiments of non-transitory computer-readable medium storing program instructions that, when executed by at least one processor, cause a corresponding camera-radar alignment controller to perform a method of generating an alignment matrix for a camera-radar system. For example, various embodiments of the camera-radar alignment controller 1600 are described above with reference to FIG. 16. Various embodiments of the method of generating an alignment matrix for a camera-radar system 1100, 1200, 1300, 1400, 1500, for example, are described above with reference to FIGS. 11-15.

In addition to the disclosure above, various exemplary embodiments of non-transitory computer-readable medium are disclosed herein. The various embodiments of non-transitory computer-readable medium store program instructions that, when executed by at least one processor, may cause a corresponding camera-radar alignment controller to perform various combinations of functions associated with the various embodiments of the processes 1100, 1200, 1300, 1400, 1500 for generating an alignment matrix for a camera-radar system described above with reference to FIGS. 11-15. For example, the various embodiments of the camera-radar alignment controller 1600 described above with reference to FIG. 16 may include the at least one processor 1602 and may perform the various combination of functions associated with generating an alignment matrix for a camera-radar system based on the program instructions stored on corresponding embodiments of the non-transitory computer readable medium.

In other words, the program instructions of the various exemplary embodiments of non-transitory computer-readable medium are defined by any suitable combination of the processes 1100, 1200, 1300, 1400, 1500 described above with reference to FIGS. 11-15. Similarly, the at least one processor 1602 and the camera-radar alignment controller 1600 associated with the various exemplary embodiments of non-transitory computer-readable medium are defined by any suitable combination of the computational device 1600 described above with reference to FIG. 11.

The above examples are merely illustrative of several possible embodiments of various aspects of the present disclosure, wherein equivalent alterations and/or modifications will occur to others skilled in the art upon reading and understanding this specification and the associated drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A method of generating an alignment matrix for a camera-radar system, the method comprising:
receiving, by a camera-radar alignment controller, first radar data from a radar subsystem, wherein the first radar data captures a radar retroreflector, the radar retroreflector having a center;
receiving, by the camera-radar alignment controller, first image data from a camera subsystem, wherein the first image data captures an object that is different from the radar retroreflector and includes a plurality of patterns that are disposed around the radar retroreflector and collectively have a centroid aligned with the center of the radar retroreflector;
processing, by the camera-radar alignment controller, the first radar data, to determine a horizontal dimension, a vertical dimension, and a distance dimension of the center of the radar retroreflector;
processing, by the camera-radar alignment controller, the first image data, to:
determine a respective center of each pattern of the plurality of patterns;
determine the centroid of the object based on the centers of the plurality of patterns; and
determine a horizontal dimension, a vertical dimension, and a distance dimension of the centroid of the object, wherein the processing of the first image data identifies the center of the radar retroreflector in the first image data by the centroid of the object;
computing the alignment matrix, by the camera-radar alignment controller, for radar and image data from the camera-radar system based on a relationship between the horizontal dimension, the vertical dimension, and the distance dimension of the center of the radar retroreflector and the horizontal dimension, the vertical dimension, and the distance dimension of the centroid of the object, wherein the alignment matrix represents an alignment between the radar subsystem and the camera subsystem; and
fusing at least a portion of the first radar data with the first image data using the alignment matrix to align the first radar data with the first image data and map points detected in the first radar data onto the first image data to produce fused radar-image data.

2. The method of claim 1, wherein:
the object is a first object;
the radar retroreflector is a first radar retroreflector;
the method further comprising:
receiving, by the camera-radar alignment controller from the radar subsystem, second radar data that captures a second radar retroreflector that has a center;
receiving, by the camera-radar alignment controller from the camera subsystem, second image data that captures a second object that is different from the second radar retroreflector and that includes a second plurality of patterns that are disposed around the second radar retroreflector and correctively have a centroid aligned with the center of the second radar retroreflector;
processing the second radar data to determine horizontal, vertical, and distance dimensions of the center of the second radar retroreflector in relation to the camera-radar system; and
processing the second image data to determine horizontal and vertical dimensions of the centroid of the second object in relation to the camera-radar system; and
the computing of the alignment matrix is also based at least in part on a functional relationship between the horizontal, vertical, and distance dimensions of the center of the second radar retroreflector and the horizontal and vertical dimensions of the centroid of the second object.

3. The method of claim 1, further comprising:
repeating the receiving and processing of the first radar data for a plurality of additional radar data representative of additional areas of interest to determine additional reflected radar points, wherein each of the additional areas of interest are in different locations in relation to at least one of horizontal, vertical, and distance dimensions from the camera-radar system; and
repeating the receiving and processing of the first image data for additional image data representative of the additional areas of interest to determine additional centroids of additional objects; and
wherein computing the alignment matrix is also based at least in part on functional relationships between the horizontal, vertical, and distance dimensions for each of the additional reflected radar points and the horizontal and vertical dimensions for the additional centroids of the additional objects.

4. The method of claim 1, further comprising;
repeating the receiving and processing of the first radar data for at least three additional radar data representative of at least three additional areas of interest to determine at least three additional reflected radar points, wherein the at least three additional areas of interest are in different locations in relation to at least one of horizontal, vertical, and distance dimensions from the camera-radar system; and
repeating the receiving and processing of the first image data for at least three additional image data representative of the at least three additional areas of interest to determine at least three additional centroids of at least three additional objects; and
wherein computing the alignment matrix for the radar and image data is also based at least in part on functional relationships between the horizontal, vertical, and distance dimensions for each of the additional reflected radar points and the horizontal and vertical dimensions for the at least three additional centroids of the at least three additional objects.

5. The method of claim 1, further comprising:
processing the first radar data using an adaptive thresholding algorithm to determine the center of the radar retroreflector.

6. The method of claim 1, further comprising:
processing the first image data using a corner detection algorithm to detect image features;
processing the image features detected from the first image data using a feature matching algorithm to identify the plurality of patterns of the object; and
processing the image features detected from the first image data using a geometric decomposition algorithm to determine the centroid of the object.

7. The method of claim 1, further comprising:
computing the alignment matrix for the camera-radar system using a linear least squares algorithm based at least in part on a functional relationship between the horizontal, vertical, and distance dimensions for the center of the radar retroreflector and the horizontal and vertical dimensions for the centroid of the object.

8. The method of claim 1, further comprising:
storing the alignment matrix in a storage device associated with the camera-radar alignment controller.

9. The method of claim 1, further comprising:
providing the fused radar-image data to a display device associated with the camera-radar alignment controller.

10. A camera-radar alignment controller for generating an alignment matrix for a camera-radar system, the camera-radar alignment controller comprising:
a radar data interface of a camera-radar alignment controller, configured to receive first radar data from a radar subsystem, wherein the first radar data captures a radar retroreflector, the radar retroreflector having a center;
an image data interface of the camera-radar alignment controller, configured to receive first image data from a camera subsystem, wherein the first image data captures an object that includes a plurality of patterns that collectively have a centroid aligned with the center of the radar retroreflector; and
at least one processor coupled to the radar data interface and to the image data interface, the at least one processor configured to:
process the first radar data to determine a horizontal dimension, a vertical dimension, and a distance dimension of a center of the radar retroreflector;
process the first image data to:
determine centers of the plurality of patterns;
determine the centroid of the object based on the centers of the plurality of patterns; and
determine a horizontal dimension, a vertical dimension, and a distance dimension of the centroid of the object to identify the center of the radar retroreflector in the first image data by the centroid of the object;
compute the alignment matrix for radar and image data based on the horizontal dimension of the center of the radar retroreflector, the horizontal dimension of the centroid of the object, the vertical dimension of the center of the radar retroreflector, the vertical dimension of the centroid of the object the distance dimension of the center of the radar retroreflector, and the distance dimension of the centroid of the object, wherein the alignment matrix represents an alignment of the radar subsystem to the camera subsystem; and
fuse at least a portion of the first radar data with the first image data using the alignment matrix to align the first radar data with the first image data and map points detected in the first radar data onto the first image data to produce fused radar-image data.

11. The camera-radar alignment controller of claim 10, wherein:
the object is a first object;
the radar retroreflector is a first radar retroreflector;
the radar data interface is further configured to receive second radar data from the radar subsystem that captures a second radar retroreflector that has a center;
the image data interface is further configured to receive second image data from the camera subsystem that captures a second object that is different from the second radar retroreflector and that has includes a second plurality of patterns that are disposed around the second radar retroreflector and correctively have a centroid aligned with the center of the second radar retroreflector; and
the at least one processor is further configured to:
process the second radar data to determine horizontal, vertical, and distance dimensions of the center of the second radar retroreflector in relation to the camera-radar system;
process the second image data to determine horizontal and vertical dimensions of the centroid of the second object in relation to the camera-radar system; and
compute the alignment matrix based at least in part on a functional relationship between the horizontal, vertical, and distance dimensions of the center of the second radar retroreflector and the horizontal and vertical dimensions of the centroid of the second object.

12. The camera-radar alignment controller of claim 10, wherein:
the radar data interface and the at least one processor are configured to repeat the receiving and processing of the first radar data for additional radar data representative of a additional areas of interest to determine additional reflected radar points, wherein each of the additional areas of interest are in different locations in relation to at least one of horizontal, vertical, and distance dimensions from the camera-radar system;
the image data interface and the at least one processor are configured to repeat the receiving and processing of the first image data for additional image data representative of the additional areas of interest to determine additional centroids of additional objects; and
the at least one processor is configured to compute the alignment matrix based at least in part on functional relationships between the horizontal, vertical, and distance dimensions for each of the additional reflected radar points and the horizontal and vertical dimensions for the additional centroids of the additional objects.

13. The camera-radar alignment controller of claim 10, wherein;
the radar data interface and the at least one processor are configured to repeat the receiving and processing of the first radar data for at least three additional radar data representative of at least three additional areas of interest to determine at least three additional reflected radar points, wherein the at least three additional areas of interest are in different locations in relation to at least one of horizontal, vertical, and distance dimensions from the camera-radar system;
the image data interface and the at least one processor are configured to repeat the receiving and processing of the first image data for at least three additional image data representative of the at least three additional areas of interest to determine a corresponding at least three additional centroids of at least three additional objects; and
the at least one processor is configured to compute the alignment matrix for the radar and image data based at least in part on functional relationships between the horizontal, vertical, and distance dimensions for each of the additional reflected radar points and the horizontal and vertical dimensions for the at least three additional centroids of the at least three additional objects.

14. The camera-radar alignment controller of claim 10, wherein the at least one processor is further configured to process the first radar data using an adaptive thresholding algorithm to determine the center of the radar retroreflector.

15. The camera-radar alignment controller of claim 10, wherein the at least one processor is further configured to:
  process the first image data using a corner detection algorithm to detect image features;
  process the image features detected from the first image data using a feature matching algorithm to identify a plurality of patterns of the object that define the centroid; and
  process the image features detected from the first image data using a geometric decomposition algorithm to determine the centroid of the object.

16. The camera-radar alignment controller of claim 10, wherein the at least one processor is further configured to compute the alignment matrix for the camera-radar system using a linear least squares algorithm based at least in part on a functional relationship between the horizontal, vertical, and distance dimensions for the center of the radar retroreflector and the horizontal and vertical dimensions for the centroid of the object.

17. The camera-radar alignment controller of claim 10, further comprising:
  a storage device configured to store the alignment matrix.

18. The camera-radar alignment controller of claim 10 further comprising:
  a display interface configured to provide the fused radar-image data to a display device associated with the camera-radar alignment controller.

19. A non-transitory computer-readable storage medium storing a program for execution by at least one processor, the program including instructions that cause the at least one processor to:
  receive, from a radar system, a set of radar data that captures a radar retroreflector having a center;
  receive, from a camera system a set of image data that captures a feature that includes a plurality of pattern elements disposed around the radar retroreflector, wherein the feature has a center aligned with the center of the radar retroreflector;
  process the set of radar data to determine a horizontal dimension, a vertical dimension, and a distance dimension of the center of the radar retroreflector;
  process the set of image data to:
    determine a respective center of each pattern element of the plurality of pattern elements;
    determine the center of the feature based on the centers of the plurality of pattern elements; and
    determine a horizontal dimension, a vertical dimension, and a distance dimension of the center of the feature and thereby identify the center of the radar retroreflector in the set of image data based on the center of the feature;
  compute an alignment matrix representing an alignment between the radar system and the camera system based on the horizontal dimensions of the center of the radar retroreflector and the center of the feature, the vertical dimensions of the center of the radar retroreflector and the center of the feature, and the distance dimensions of the center of the radar retroreflector and the center of the feature; and
  fuse at least a portion of the set of radar data with the set of image data using the alignment matrix to align the set of radar data with the set of image data and map points detected in the set of radar data onto the set of image data.

20. The non-transitory computer-readable storage medium of claim 19, wherein:
  the program includes instructions that cause the at least one processor to:
    apply a corner detection algorithm to the set of image data to identify a set of image features;
    apply a feature matching algorithm to detect the plurality of pattern elements within the set of image features; and
    apply a geometric decomposition algorithm to determine the center of the feature based on the plurality of pattern elements.

* * * * *